May 3, 1932.  B. SAKOWICZ  1,856,266
VALVE LOCK
Filed May 23, 1931
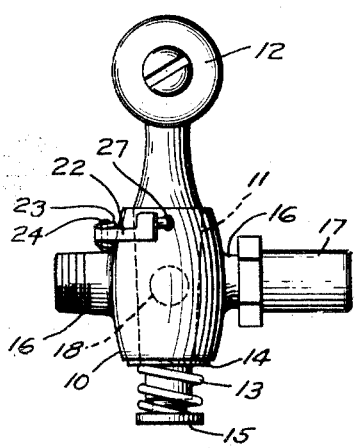
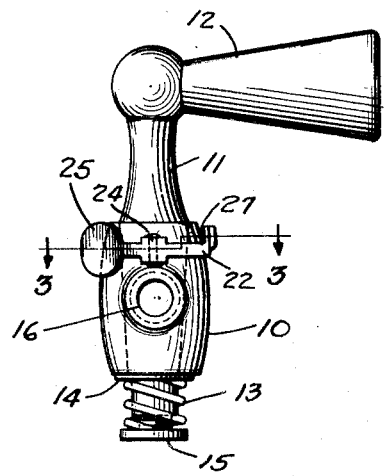
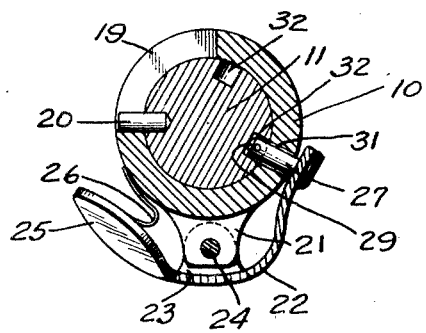
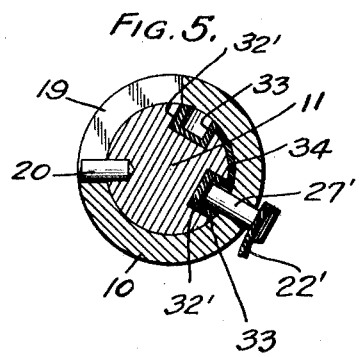
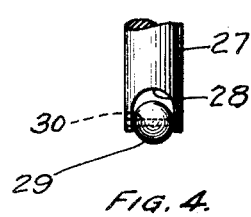
INVENTOR
B. SAKOWICZ
BY
ATTORNEY.

Patented May 3, 1932

1,856,266

UNITED STATES PATENT OFFICE

BOLESLAW SAKOWICZ, OF CHICAGO, ILLINOIS, ASSIGNOR OF ONE-HALF TO FILIMON WASILEWSKI, OF CHICAGO, ILLINOIS

VALVE LOCK

Application filed May 23, 1931. Serial No. 539,452.

The present invention relates to valve locks and has particular application to valves in gas ranges and stoves, the principal object thereof being the provision of a device in association with a valve plug and valve casing to hold the same in relative locked position and to prevent any inadvertant opening of the valve.

Usually valves of the character indicated are made of brass or other like soft metal. The present invention is intended to provide a tensioning pin to interlock the valve casing with the valve plug, which pin is adapted to slide upon the periphery of the valve plug. Therefore, a further object of the present invention is the provision of means whereby said pin would not scratch or otherwise damage the valve plug.

A still further object of the present invention is the provision of a lining strip of harder material, mounted upon the periphery of the valve plug in the path of movement of the pin for preventing damage to the valve plug by said pin.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views, Figure 1 is a side elevational view of the valve plug;

Figure 2 is a side elevational view of the valve plug transversely of the manifold;

Figure 3 is a transverse cross-sectional view through the valve on line 3—3 of Figure 2;

Figure 4 is an enlarged detailed view of the pin constituting a part of the present invention; and Figure 5 is a transverse cross-sectional view similar to that of Figure 3, showing the modified form of the present invention.

Referring to the present drawings there is shown therein a usual valve casing 10 having a vertical tapered bore therein, where the tapered portion of valve plug 11 is insertable. The upper end of said valve plug 11 terminates in a usual handle 12 whereby said valve plug is rotated within valve casing 10 for opening or closing the valve. The lower end of valve plug 11 extends below the lower end of valve casing 10 and is encompassed by coil spring 13, which is interposed between washer 14 and screw 15, the lowermost termination of said valve plug 11 is threaded for receiving thereupon said screw 15, for the purpose of urging said valve plug within casing 10 to bring about a close fit between the inner periphery of the casing and the contacting periphery of valve plug 11 so as not to permit the escape of the gas when the valve plug 11 is in a closed position.

Valve casing 11 has a horizontal transverse bore communicating with pipe stubs 16 one of which connects to manifold 17 and the other of which leads to the burner and through which the gas is supplied to the valve casing. Valve plug 11 is provided with a transverse bore 18, which is adapted to register with pipe stubs 16 when the valve plug is in an open position with respect to the valve casing 10. When the handle 12 is turned to assume a transverse relation with respect to pipe stub 16 valve 18 in the valve plug 11 will remain in a transverse position with respect to said pipe stubs 16 in which case the valve will remain closed, the solid periphery contacting with the bores in the pipe stub 16 blocking further flow of the gas.

The upper edge of valve casing 10 has a cut away portion resulting in recess 19 which recess extends one-fourth of the circumference of said valve casing 10, because it requires only one-fourth of the rotary movement of the valve plug 11 to bring the same to an open or to a closed position with respect to valve casing 10. Horizontal pin 20 rigidly mounted in said valve plug 11 is adapted to strike or contact with the vertical sides of recess 19 for limiting further rotary movement of the valve plug in either direction when handle 12 is manually operated.

The above is the usual construction of the valve with which the present invention is intended to operate. The present invention includes ear 21 integrally formed with valve casing 10 and outwardly projecting therefrom slightly above pipe stub 16 which leads to the burner, said ear being in horizontal position when the valve remains in usual operative association with the range.

The invention further includes a curved lever arm 22 at the center of which and from its edges, two horizontal plates 23 project. Between said plates 23 ear 21 is receivable. Pin 24 passing through said ear 21 and plates 23 provides a hinge connection for shifting lever arm 22.

One end of said lever 22 is enlarged to provide a thumb plate 25 for manually pressing thereupon. A substantially U-shaped leaf spring 26 rigidly mounted by one of its ends upon the valve casing 10, is adapted to urge thumb plate 25 away from the adjacent portion of valve casing 10, and to drive the other end of lever arm 22 towards said valve casing 10. Said other end of lever arm 22 is provided with pin 27 which is rigidly affixed to said end of lever arm 22 and is substantially in a perpendicular juxta-position with relation thereto. The free end of said pin 27 is bifurcated as at 28 for receiving ball 29 which is mounted upon pin 30 and upon which said ball 29 is adapted to rotate, said pin 30 being in transverse relation with lever arm 22 and is adapted to assume a vertical position when the valve is in its usual operative position on a range. The valve casing is provided with opening 31 for permitting said pin 27 to enter inwardly thereof.

The valve plug 11 is provided with two bores 32, each of which remains on the same horizontal plane and in the path of pin 27 and which are spaced from each other by a distance of substantially one-fourth of the circumference of the valve plug 11 at that point.

From the hereinabove description it will be apparent that on manually pressing at thumb plate 25 against the tension of spring 26 pin 27 will become withdrawn from within either one of bores 32, at which time handle 12 is manually turned for imparting the rotation of valve plug 11 for opening or closing the valve, depending on which direction handle 12 is turned. When said pin 27 is withdrawn from bore 32 and handle 12 is turned, and thumb plate 25 is released, pin 27 would contact with the periphery of valve plug 11 and would travel upon a line connecting bores 32. Since valve plugs are usually made of brass or other soft material the pin would likely scratch the surface of valve plug 11 at the stated point. Ball 29 acts as a caster rotating upon the periphery of valve plug 11, while the same is being turned, hence the pin does not damage the valve plug. Of course, when the next bore 32 comes in alinement with opening 21 pin 27 automatically springs into said bore 32.

The modified form of the invention, shown on Figure 5, contemplates an ordinary pin 27' eliminating ball 29, said pin 27' is likewise mounted upon a similar lever arm 22'. Bores 32' are larger in diameter than bores 32 in the preferred form of the invention, for receiving therewithin cups or bushings 33 with which peripheral and bottom walls of said bores 32' are lined. Said bushings 33 are connected by a curved strip 34. The valve plug 11 is suitably channeled wherein said strip 34 is receivable and frictionally held therewithin. Thus the outer face or strip 34 will remain flush with the periphery of valve plug 11. Both said bushings 33 and strip 34 are made of iron or other hard metal, and act as a protection for valve plug 11 against the tendency of pin 27' to scratch or otherwise damage valve plug 11 at a point which is in the path of operation of said pin 27'. In all other respects said pin 27' operates in a like manner as pin 27. The same being adapted to enter bushings 33, one or the other, depending into which direction handle 12 was turned and consequently to which direction valve plug 11 was rotated, for either closing or opening the valve as the case may be.

While there is described herein a preferred embodiment of the present invention it is nevertheless to be understood that minor changes may be made therein without departing from the spirit and scope of the invention as claimed.

What I claim as new is:

1. In a valve including a casing and a valve plug positioned and adapted for rotary movement therewithin for opening or closing of the valve, a lever arm hingedly mounted upon said casing, said casing being provided with an opening, said valve plug being provided with a pair of spaced and radially extending bores, said opening and said bores being upon the same horizontal plane, a pin mounted upon one end of said lever arm, said pin being adapted to extend through said opening, a bushing positioned within each of said bores, said pin being adapted to enter one of said bushings when said valve plug is rotated into one or the other direction, and a strip connecting said bushings, said strip being receivable within a recess made at the intermediate peripheral portion of said valve plug and between said bushings.

2. In a valve including a casing and a valve plug positioned and adapted for rotary movement therewithin for opening or closing of the valve, a lever arm hingedly mounted upon said casing; said casing being provided with an opening, said valve plug being provided with a pair of spaced and radially extending bores, said opening and said bores being upon the same horizontal plane, a pin mounted upon one end of said lever arm, said pin being adapted to extend through said opening, a bushing positioned within each of said bores, said pin being adapted to enter one of said bushings when said valve plug is rotated into one or the other direction, and a strip connecting said bushings, said strip being receivable within a recess made at the intermediate peripheral portion of said valve plug and between said bushings, said bushings and said strip constituting protecting lining for portions of said valve plug with which said pin is adapted to contact.

3. In a valve including a casing and a valve plug positioned and adapted for rotary movement therewithin for opening or closing of the valve, a lever arm hingedly mounted upon said casing, said casing being provided with an opening, said valve plug being provided with a pair of spaced and radially extending bores, said opening and said bores being upon the same horizontal plane, a pin mounted upon one end of said lever arm, said pin being adapted to extend through said opening, a bushing positioned within each of said bores, said pin being adapted to enter one of said bushings when said valve plug is rotated into one or the other direction, a strip connecting said bushings, said strip being receivable within a recess made at the intermediate peripheral portion of said valve plug and between said bushings, said bushings and said strip constituting protecting lining for portions of said valve plug with which said pin is adapted to contact, and tensioning means at the other end of said lever arm urging said pin towards said valve plug.

In witness whereof I affix my signature.

BOLESLAW SAKOWICZ.